NICHOLAS GERGEN.
Improvement in Cooking Apparatus.
No. 121,164. Patented Nov. 21, 1871.
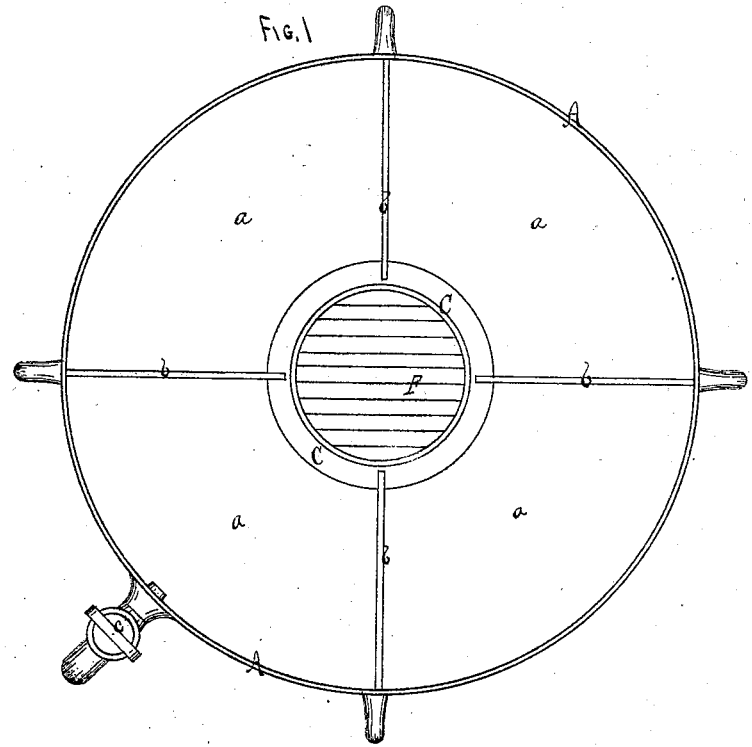
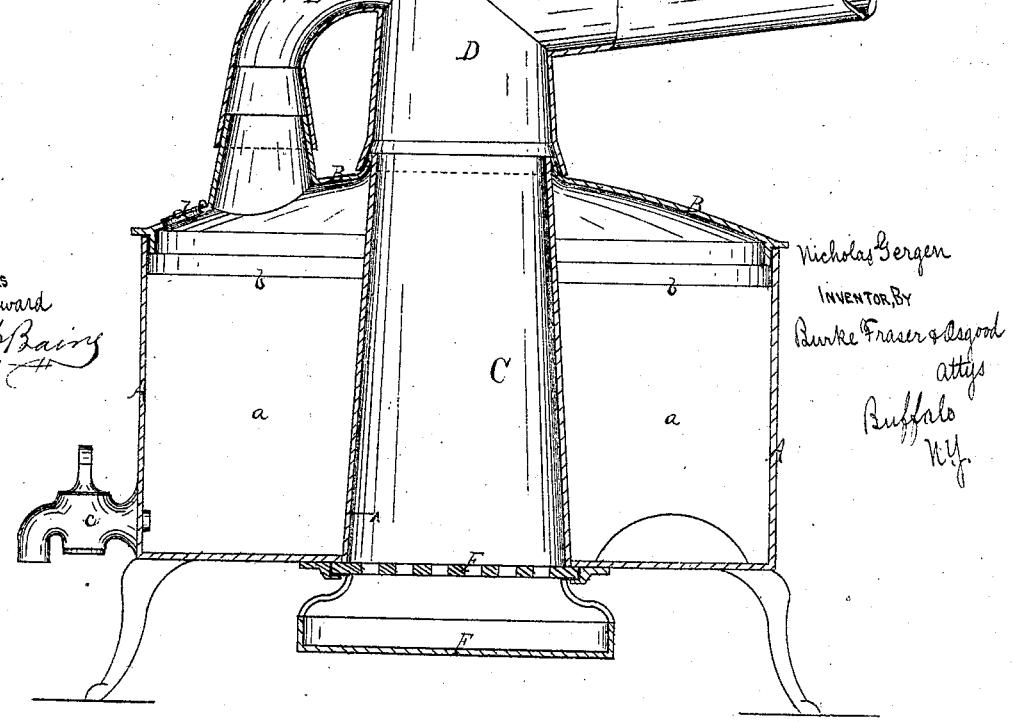

UNITED STATES PATENT OFFICE.

NICHOLAS GERGEN, OF BUFFALO, NEW YORK.

IMPROVEMENT IN COOKING APPARATUS.

Specification forming part of Letters Patent No. 121,164, dated November 21, 1871,

*To all whom it may concern:*

Be it known that I, NICHOLAS GERGEN, of Buffalo, in the county of Erie and State of New York, have invented certain Improvements in Summer Cooking-Stoves, of which the following is a specification:

This invention relates to a culinary device for cooking in summer, which comprises a central compartment for the fire, surrounded by chambers separated by partitions, in which various kinds of food can be cooked, the gas, steam, and smoke of which are all conveyed away through a pipe or pipes situated at or near the dome or top, as hereinafter fully described.

In the drawing, Figure 1 is a plan view with the cover removed. Fig. 2 is a cross-section.

A is the outside case, made of thin metal, either in cylindrical, rectangular, octagonal, or other desirable form, with or without doors. B is the cover or dome, made removable, or else hinged so that it can be swung open to get at the different compartments which are represented by letters $a$ $a'$ $a''$ $a'''$, and are divided by partitions $b$ $b$ $b$ $b$. These compartments are formed around or encircle a central cone-shaped cylinder, C, which will contain the fire, and the heat radiated from this cooks the food, &c., placed in the different utensils which set in the separate chambers. One of these can be arranged for hot water, another for tea or coffee, with an outside faucet to run out the liquid, as shown at $c$. As many of these compartments may be constructed as desired. A pipe, D, for conveying off the smoke, &c., is connected through the dome B with the fire-cylinder, which, with proper elbows or connections, can run into a chimney or out of a window. To remove all the odor of the cooking and to carry off all steam, gases, &c., generated in the stove, I connect a small pipe, E, from the top of the dome or cover B, with the smoke or draught-pipe D. All the gas, &c., rises up from the different compartments to the inside of the dome B, and will make their escape through this pipe E into the chimney. By this means I do away with all the unpleasant smells from cooking, especially in summer, and any kind of food having the most pungent odor can be cooked without its being noticed, even in the same room. $d$ represents a small valve, hinged over an opening just over the tea or coffee compartment, which will be lifted up by the steam when the liquid boils. F represents the grate and ash-pan under the stove, formed together and removed together, so that the fire can be drawn out at any moment.

Among its many advantages are the simplicity and cheapness of its construction; the many kinds of food that can be cooked at the same time; and the very small amount of fuel required to be used. A few pieces of wood, charcoal, or hard coal will be sufficient to do a moderately-necessary amount of cooking, and this will be of great importance to poor people, besides doing away with the necessity of building fires in the regular kitchen stove in warm weather, which heats up the house. My stove will work equally well in or out of doors, and for camping out would be found extremely useful, it being of portable form. If necessary, the fire-cylinder can be lined with fire-brick. The dishes are put into the compartments either through an opening in the cover or pipe; or by dividing the cover and raising one side; or else swinging open or through doors arranged in the outer case, as may be desired. The stove can also be constructed with a double bottom, to which the partitions may or may not be attached, which will revolve, and a single door or opening be made in the outside case, through which all food or cooking vessels may be introduced.

I am acquainted with stoves having a central drum with the fire-cylinder encircling them; but these are not the equivalent of my central drum, which is for the fire, while the outside space is partitioned off into various chambers, as before described.

I claim—

The construction and arrangement of the stove, consisting of the central fire-cylinder C, the partitions $b$ $b$ $b$ $b$, forming the cooking chambers $a$ $a'$ $a''$ $a'''$, or their equivalents, the removable dome or cover B or its equivalent, and the pipe E, in combination with the outer case A and pipe D, substantially as hereinbefore specified.

In witness whereof I have hereunto signed my name in the presence of two subscribing witnesses.

NICHOLAS GERGEN.

Witnesses:
 J. R. DRAKE,
 JOHN MILLER.